United States Patent
Howitt et al.

(10) Patent No.: US 11,913,434 B2
(45) Date of Patent: Feb. 27, 2024

(54) ENERGY STORAGE WITH HYDROGEN

(71) Applicant: STORELECTRIC LIMITED, Preston (GB)

(72) Inventors: Mark Aidan Howitt, Stoke-on-Trent (GB); Jeffrey Thomas Draper, Preston (GB)

(73) Assignee: STORELECTRIC LIMITED, Preston (GB)

( * ) Notice: Subject to any disclaimer, the term of this patent is extended or adjusted under 35 U.S.C. 154(b) by 491 days.

(21) Appl. No.: 17/263,817

(22) PCT Filed: Aug. 1, 2019

(86) PCT No.: PCT/GB2019/052168
§ 371 (c)(1),
(2) Date: Jan. 27, 2021

(87) PCT Pub. No.: WO2020/025966
PCT Pub. Date: Feb. 6, 2020

(65) Prior Publication Data
US 2021/0293221 A1 Sep. 23, 2021

(30) Foreign Application Priority Data
Aug. 1, 2018 (GB) .................................... 1812568

(51) Int. Cl.
*F03D 9/18* (2016.01)
*F02C 6/10* (2006.01)
(Continued)

(52) U.S. Cl.
CPC .................. *F03D 9/18* (2016.05); *F01K 3/02* (2013.01); *F01K 3/08* (2013.01); *F02C 6/10* (2013.01);
(Continued)

(58) Field of Classification Search
CPC ..... F03D 9/18; F01K 3/02; F01K 3/08; F02C 6/10; H02J 15/006; F05D 2260/42; Y02E 60/32
See application file for complete search history.

(56) References Cited

U.S. PATENT DOCUMENTS

2011/0094242 A1  4/2011 Koerner
2015/0300209 A1  10/2015 Goldman
2016/0216044 A1  7/2016 Narine et al.

FOREIGN PATENT DOCUMENTS

CN    102292533 A    12/2011
CN    102661175 A    9/2012
(Continued)

OTHER PUBLICATIONS

"International Search Report and Written Opinion of the International Searching Authority", International Application No. PCT/GB2019/052168, dated Oct. 29, 2019, 15 pp.
(Continued)

*Primary Examiner* — Audrey B. Walter
(74) *Attorney, Agent, or Firm* — Myers Bigel, P.A.

(57) ABSTRACT

In A method of energy storage comprises receiving input energy (1) and using the input energy to compress (2) air or other process gas to produce a compressed process gas. The compressed process gas is stored (8). The compressed process gas is expanded (16) to generate output energy (17). Heat is transferred (5) from the process gas, before the process gas is stored (8) as a compressed process gas, to a hydrogen production process (10). The transferred heat is used in the hydrogen production process (10). The hydrogen may be stored (13) and subsequently used to heat to provide heat prior to, during, or after expanding (16) the compressed gas.

20 Claims, 9 Drawing Sheets

(51) Int. Cl.
- *H02J 15/00* (2006.01)
- *F01K 3/08* (2006.01)
- *F01K 3/02* (2006.01)

(52) U.S. Cl.
CPC ........ *H02J 15/006* (2013.01); *F05D 2260/42* (2013.01); *Y02E 60/32* (2013.01)

(56) References Cited

FOREIGN PATENT DOCUMENTS

| | | | |
|---|---|---|---|
| CN | 103883400 A | 6/2014 | |
| CN | 205260083 U | 5/2016 | |
| CN | 205478104 U | 8/2016 | |
| CN | 107532513 A | 1/2018 | |
| DE | 4436904 A1 | 4/1996 | |
| EP | 2503114 A2 * | 9/2012 | ............ F01K 23/10 |
| EP | 3296546 A1 | 3/2018 | |

OTHER PUBLICATIONS

"Patents Act 1977: Combined Search and Examination Report under Sections 17 and 18(3)", GB Application No. GB1911018.8, dated Jan. 21, 2020, 7 pp.

"Patents Act 1977: Search Report under Section 17(5)", GB Application No. GB1812568.2, dated Jan. 29, 2019, 4 pp.

"Patents Act 1977: Search Report under Section 17(6)", GB Application No. GB1812568.2, dated Mar. 15, 2019, 2.

Crotogino, Fritz, et al., "Energy Storage In Salt Caverns I Developments and Concrete Projects for Adiabatic Compressed Air and for Hydrogen Storage", Solution Mining Research Institute Technical Conference Paper, Jan. 1, 2008, pp. 1-12.

First Office Action with English language translation, CN Application No. 201980050477.1, dated Oct. 31, 2023, 20 pp.

* cited by examiner

ENERGY STORAGE WITH HYDROGEN

RELATED APPLICATIONS

This application is a 35 U.S.C. § 371 national stage application of PCT Application No. PCT/GB2019/052168, filed on Aug. 1, 2019, which claims priority from Great Britain Patent Application No. 1812568.2, filed on Aug. 1, 2018, the contents of which are incorporated herein by reference in their entireties. The above-referenced PCT International Application was published in the English language as International Publication No. WO 2020/025966 A1 on Feb. 6, 2020.

TECHNICAL FIELD

The present invention relates to energy storage. In particular but not exclusively, the invention relates to Compressed Air Energy Storage (CAES) in conjunction with hydrogen.

BACKGROUND

Compressed Air Energy Storage (CAES) is known, having been first implemented on a large scale at Huntorf in Germany in 1978. In such a system, electricity is converted into compressed air energy using a compressor arrangement. An electric motor associated with the compressor arrangement powers the compressor arrangement to generate compressed air. The compressed air is then stored, in Huntorf's case in salt caverns beneath the plant. As such, the stored compressed air constitutes a store of energy. When electricity is wanted from the plant, the stored energy is extracted. In particular, the compressed air is extracted from the caverns and expanded to generate (or to help generate) electricity, that is, for the electricity regeneration process. In Huntorf's case, the regeneration process is achieved by mixing the compressed air with natural gas and then feeding this mixture into a gas turbine and associated electric generator to generate electricity: the addition of the compressed air increases the efficiency of the gas turbine. The gas turbine is one form of expander—the mixture of natural gas and compressed air is combusted and then passed through the turbine and expanded to atmospheric pressure. Thus this configuration feeds compressed air into an open-cycle gas turbine power station: it is essentially a gas-fired power station rendered more efficient by the compressed air. There has been a similar implementation since 1992 in Macintosh, Alabama, USA. Compressed air energy storage (CAES) using methane to heat the air during expansion is well known.

Compressing air in the compressor arrangement is an exothermic process. A significant quantity of heat is generated. In the above plants heat extracted from the compressed air is wasted, prior to storing the cooled compressed air. Expanding air is an endothermic process. During expansion and electricity generation, both of the above plants heat the air by combusting natural gas.

The Adele Project, proposed in the year 2000 by GE of America and RWE of Germany, proposed to store the heat of compression by heating up ceramics. This project would recover the heat from the ceramics to heat the air during expansion and generation.

There are some initiatives to use renewable energy to generate hydrogen by electrolysis which is either by injected into the gas grid or used to power fuel cells; there is no use of extrinsic heat in the electrolysis process, which is thereby an inefficient and costly process.

It is an aim of the present invention to address disadvantages associated with the prior art.

SUMMARY OF THE INVENTION

Embodiments of the invention may be understood with reference to the appended claims.

An aspect of the present invention provides a method of energy storage comprising: receiving input energy; using the input energy to compress air or other process gas to produce a compressed process gas; storing the compressed process gas; expanding the compressed process gas to generate output energy; and further comprising: performing a hydrogen production process; transferring heat from the process gas, before the process gas is stored as a compressed process gas, to the hydrogen production process; and using the transferred heat in the hydrogen production process.

By process gas is meant gas that is subject to processing according to a process. Thus in embodiments of the present invention, the process gas is a gas that is compressed to produce a compressed process gas. The process gas may be a readily available gas such as air, or any other suitable gas.

Transferring heat may comprises at least one of: transferring heat from the process gas before compression of the process gas; transferring heat from the process gas during compression of the process gas; transferring heat from the process gas after compression of the process gas.

Transferring heat may comprise direct transfer from the process gas to the hydrogen production process, or may comprise: transferring heat from the process gas to a thermal transfer medium; and transferring heat from the thermal transfer medium to the hydrogen production process.

Transferring heat may comprise transferring heat from the process gas to water in order to heat the water; and the hydrogen production process operates upon the heated water.

The water may be from an un-purified or partially purified source such as, but not restricted to, the sea, a lake, a river, an aquifer or a process such as, but not restricted to, the solution mining of a salt cavern.

Some or all of the hydrogen produced by the hydrogen production process may be used in at least one of the following ways: output externally of the energy storage system; output to an industrial process; output for bottling; used to form ammonia; used in another chemical process; used for one or more fuel cells.

The method may comprise storing hydrogen produced by the hydrogen production process.

The hydrogen production process may produce hydrogen by at least one of: electrolysis of heated or unheated water; steam recombination; pyrolysis; thermolysis; thermochemical and/or chemical reaction; one or more biological processes; anaerobic corrosion; serpentinisation.

The method may comprise storing at least some of the hydrogen produced by the hydrogen production process and using at least some of the stored hydrogen to provide heat prior to, during, or after expanding the compressed gas.

The method may use at least some of the stored hydrogen by combusting the hydrogen.

The method may use at least some of the stored hydrogen by an exothermic chemical reaction or sequence or combination of chemical reactions using the hydrogen.

The hydrogen production process may also generate oxygen. The method may further comprise storing at least some of the oxygen produced by the hydrogen production process.

The method may further comprise using at least some of the stored oxygen to provide heat prior to, during, or after expanding the compressed gas. Some or all of the oxygen may also be put to other uses.

The method may comprise transferring heat from the process gas, before the process gas is stored as a compressed process gas, to a thermal store and using heat in the thermal store to pre-heat the hydrogen and/or oxygen.

The hydrogen production process may produce hydrogen and oxygen. At least some of the stored hydrogen may be used in a fuel cell or other chemical reaction to generate electricity and/or heat; and powering a heater with the generated electricity to provide heat prior to, during, or after expanding the compressed gas.

The hydrogen production process may produce hydrogen and oxygen. The method may comprise using the hydrogen and oxygen in a fuel cell to generate output electricity. The method may comprise using the produced hydrogen and oxygen from an external source (e.g. the air) in a fuel cell to generate electricity.

The hydrogen production process may produce hydrogen and oxygen. At least some of the stored hydrogen may be combusted to provide heat prior to, during, or after expanding the compressed gas.

The method may comprise transferring heat from the process gas, before the process gas is stored as a compressed process gas, to a thermal store and transferring heat from the thermal store to the process gas prior to, during, or after expansion of the compressed gas.

The hydrogen may be stored in one or more of: a subterranean cavern; a wholly or partially depleted hydrocarbon well; an aquifer; a natural or man-made subterranean feature; a man-made artefact such as a cylinder; a solid such as, but not restricted to, one or more of metal hydrides, graphene and activated carbon.

The process gas may be air.

Some or all of the input energy may be electricity from a grid, and/or from one or more intermittent sources, and/or from a renewable source, and/or from traditional sources.

The output energy may be electricity.

Another aspect of the present invention provides a method of energy storage, comprising: receiving input energy; using the input energy to compress air or other process gas to produce a compressed process gas; storing the compressed process gas; performing a hydrogen production process; and transferring heat from the process gas, before the process gas is stored as a compressed process gas, to the hydrogen production process; and using the transferred heat in the hydrogen production process.

This aspect may be combined with one or more described or claimed features of the other aspects.

Another aspect of the present invention provides a method of energy storage, comprising: receiving a compressed process gas from a compressed gas store; expanding the compressed process gas to generate output energy; and using hydrogen to provide heat prior to, during or after expansion of the process gas.

The method may combust hydrogen to provide heat, or use the hydrogen in an exothermic chemical reaction or sequence or combination of chemical reactions to provide heat.

The hydrogen may be hydrogen which is produced by the hydrogen production process. Alternatively, all or some of the hydrogen may be received from an external source (e.g. via pipeline, tanker or other source).

The method may comprise outputting wholly or partially purified water as a product of the combustion.

This aspect may be combined with one or more described or claimed features of the other aspects.

There is also provided an energy storage system which is configured to perform the method according to any of the aspects.

Another aspect of the present invention provides an energy storage system, comprising: an input to receive input energy; a compressor arrangement configured to use the input energy to compress air or other process gas to produce a compressed process gas; a compressed gas output configured to output the compressed process gas to a compressed process gas store; a hydrogen production apparatus which is configured to produce hydrogen; an expander arrangement configured to receive compressed process gas from the compressed process gas store and to expand the compressed process gas to generate output energy; an output to output generated output energy; and optionally a heat transfer apparatus configured to transfer heat from the process gas, before the process gas is stored as a compressed process gas, to the hydrogen production apparatus, and wherein the hydrogen production apparatus is configured to use the transferred heat.

The heat transfer apparatus may be configured to transfer heat from the process gas to a thermal transfer medium and to transfer heat from the thermal transfer medium to the hydrogen production apparatus.

The heat transfer apparatus may be configured to transfer heat from the process gas to water in order to heat the water, and the hydrogen production apparatus is configured to operate upon the heated water.

The hydrogen production apparatus may be configured to perform electrolysis on the heated water.

The system may comprise a hydrogen output configured to output hydrogen produced by the hydrogen production apparatus to a hydrogen store.

The system may be configured to use at least some of the stored hydrogen to provide heat prior to, during, or after expansion of the compressed gas.

The system may comprise a combustor configured to combust at least some of the stored 20 hydrogen to provide at least some heat required prior to, during, or after expanding the compressed process gas.

The hydrogen production apparatus may be configured to produce hydrogen and oxygen, the system further comprising: an oxygen output to output oxygen to an oxygen store; an 25 oxygen input to receive oxygen from the oxygen store; and the combustor is configured to combust at least some of the stored oxygen for combustion to provide heat prior to, during, or after expanding the compressed gas.

The system may comprise a thermal store and wherein the heat transfer apparatus may be configured to transfer at least some of the heat from the process gas, before the process gas is stored as a compressed process gas, to the thermal store.

The system may comprise a second heat transfer apparatus configured to transfer heat from the thermal store to the process gas prior to, during, or after expanding the compressed process gas.

The hydrogen production process may be configured to produce hydrogen and oxygen and the second heat transfer apparatus may be configured to transfer heat from the thermal store to pre-heat the hydrogen and/or oxygen before combustion.

The hydrogen production apparatus may be configured to produce hydrogen and oxygen, and the system may comprise: a fuel cell configured to use the hydrogen and oxygen to generate electricity; and a heater configured to use the generated electricity to provide heat prior to, during, or after expanding the compressed gas.

The hydrogen production apparatus may be configured to produce hydrogen and oxygen, and the system may comprise a fuel cell which is configured to use the hydrogen and oxygen to generate output electricity, or a combustor which is configured to combust hydrogen in either pure form or a mixture with one or more other gases.

Another aspect of the present invention provides apparatus for an energy storage system, comprising: a compressor arrangement configured to use the input energy to compress air or other process gas to produce a compressed process gas; a compressed gas output configured to output the compressed process gas to a compressed process gas store; a hydrogen production apparatus which is configured to produce hydrogen; a heat transfer apparatus configured to transfer heat from the process gas, before the process gas is stored as a compressed process gas, to the hydrogen production process; and wherein the hydrogen production apparatus is configured to use the transferred heat. This aspect may be combined with one or more described or claimed features of the other aspects.

Another aspect of the present invention provides a compressed air energy storage system, comprising: a compressed gas input to receive a compressed process gas from a compressed process gas store; an expander arrangement configured to expand the compressed process gas to generate output energy; an output to output generated output energy; and a combustor configured to combust hydrogen to provide heat prior to, during or after expansion of the process gas. This aspect may be combined with one or more described or claimed features of the other aspects.

An advantage of at least one aspect is to provide a use for heat on the input/compression side of the energy storage system to increase the efficiency of making hydrogen. The hydrogen may subsequently be combusted to heat the process gas during the output/expansion side of the energy storage system, or may be used elsewhere.

There are some existing initiatives to use renewable energy to generate hydrogen by electrolysis, which is either injected into the gas grid or used to power fuel cells. It is to be understood that in some embodiments of the present invention, the heat generated on the input/compression side may be used to heat the water used in the electrolysis process to increase the efficiency of the process.

The storage of energy, particularly of electrical energy from intermittent sources, is a major challenge. Many battery, flywheel, thermal and other systems do so on a small scale. Storing such energy by producing hydrogen would enable any volume of energy to be stored at any time, for use at any time, which therefore makes hydrogen production and storage a very desirable means of storing energy.

The production and storage of hydrogen on its own is not yet developed at suitable scales and efficiencies for grid-scale storage systems. Therefore combining it with CAES offers the potential of storage systems of very large size and high efficiencies.

The hydrogen production process, such as electrolysis, steam reforming and thermolysis, and also potentially including thermochemical, biological and other production processes, are rendered more efficient when their operating temperatures are increased.

The addition of certain mineral ions to the water can catalyse the electrolysis process, especially of cations with lower electrode potential than the hydrogen ion, including sodium and potassium. These can be dissolved in the water in their salt forms, or brine may also be used, for example sea water, or brine from the solution mining of salt caverns.

An energy storage system is integrated with one, or both of, hydrogen production in relation to the compression cycle of the energy storage system, and hydrogen combustion in relation to the expansion cycle of the energy storage system.

In the case of hydrogen production in relation to the compression cycle of the energy storage system, some of the power fed into the plant, for example from a renewable power source, is used to compress the air. Another part of such power is used to produce hydrogen.

Such produced hydrogen may be stored for later use within the system, and/or extracted for other purposes such as but not restricted to injecting into a gas pipeline or system, or selling as a bottled gas. If injected into a gas pipeline or system, such pipeline or system may be configured to carry hydrogen wholly, principally or partially; if principally or partially, such hydrogen may mix with another gas within the pipeline or system.

Optionally, such hydrogen may derive wholly or partly from other sources.

The heat of compression is optionally extracted from the air during compression using a heat exchanger, which may be either integrated with the compression means or separate from such means. This may be done optionally in one or in multiple stages. Additional thermal transfer means, of any type (of which there are many that are well known), may optionally be used to transfer heat from the heat exchanger to the hydrogen production means.

All or part of the heat of compression may optionally be used to increase the efficiency of one or more hydrogen production process or processes. Such processes may include, but are not limited to, electrolysis, steam reforming, thermolysis, thermochemical, biological and other production processes.

It is envisaged that a significant amount of heat may remain after catalysing the production of hydrogen. Such residual heat may optionally be stored for later use in pre-heating the air and/or the hydrogen and/or other gases and/or any other element of the system during the expansion phase.

Optionally, some or all of the heat of compression, and/or the residual heat following hydrogen production catalysis may be used for other purposes, such as but not restricted to district or industrial heating, electricity generation and process catalysis. Such use of the heat for other purposes may be undertaken in conjunction with using the heat of combustion to assist the electrolysis process.

In the case of hydrogen combustion in relation to the expansion cycle of the energy storage system, the hydrogen may be combusted to heat the air prior to, during or after expansion. This may be pure hydrogen, or diluted for example with steam or air in order to control the 35 combustion temperature. It may be combusted in single or multiple stages. The combustion of hydrogen may take place within a combustion chamber, or within a gas turbine, or in some other configuration. The hydrogen may optionally be mixed with one or more other gases prior to or during combustion, such as but not restricted to oxygen, one or more hydrocarbon gases, steam and/or air.

In some embodiments, some or all of the hydrogen and/or oxygen produced by this process may be used for other purposes.

Optionally, heat may be fed into the plant independently of electricity, for example from a geothermal source, from solar thermal power or from an industrial process; other sources of heat may be used.

The heat required during expansion may be generated by combustion of hydrogen, preferably of the hydrogen stored during the compression phase of the process.

The hydrogen that is combusted during the expansion phase may be pure hydrogen, or may be mixed with another substance such as, but not limited to, air, nitrogen, steam, methane, bio-methane or any form of syngas.

During combustion, water and/or steam is produced. Such water produced by this process may be used for other purposes, such as but not restricted to drinking water and process water for industrial applications.

It is to be noted that such produced water may be pure, distilled and/or demineralised. Such water may be treated before further use.

Optionally, some of the heat absorption during expansion may be used for other purposes, such as but not restricted to refrigeration, air conditioning, preservation and cryogenic applications.

As the catalysed hydrogen production process may not use up all the heat of compression, some heat (at temperatures significantly above ambient) may remain in the transfer means.

Within the scope of this application it is envisaged that the various aspects, embodiments, examples and alternatives, and in particular the individual features thereof, set out in the 35 preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
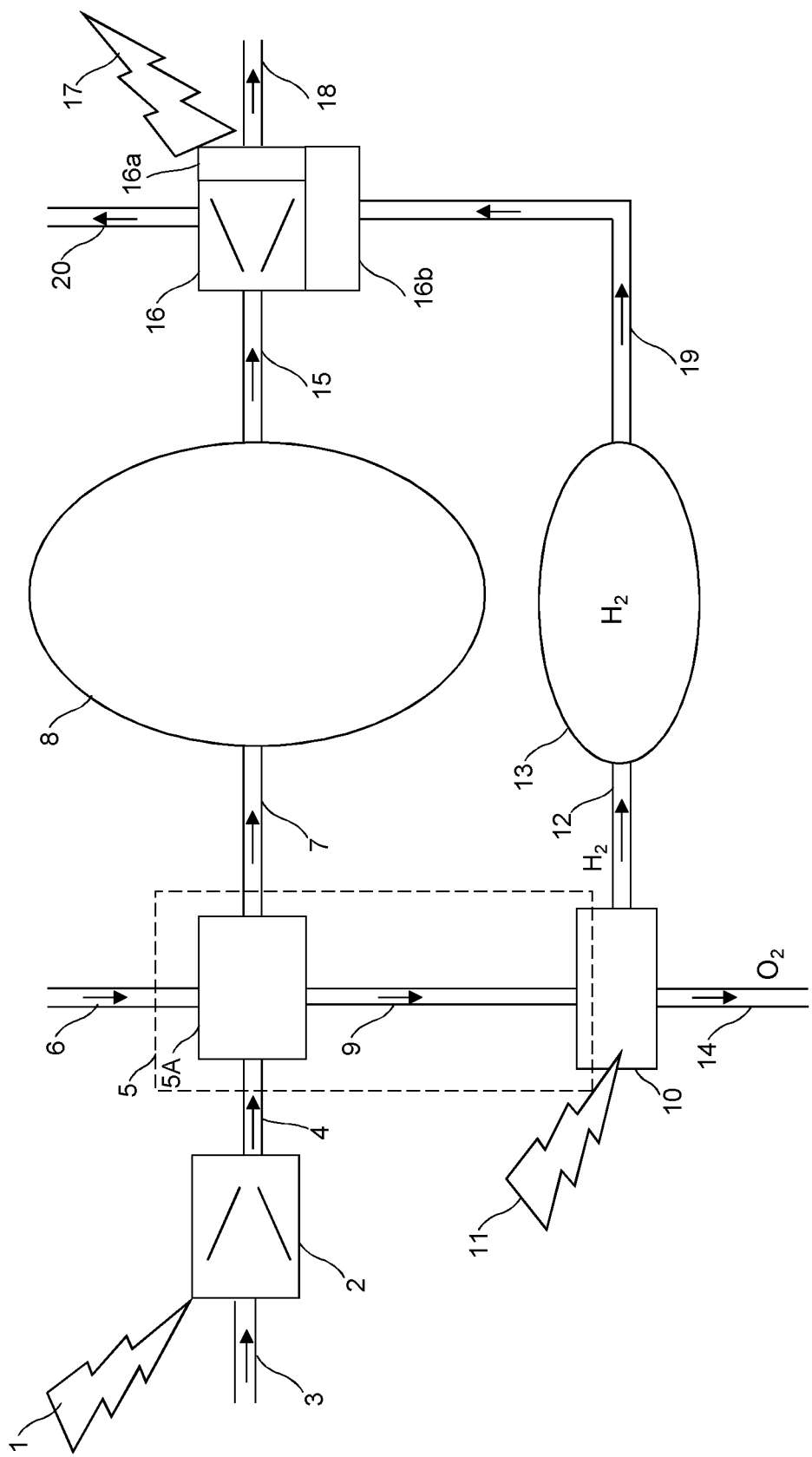
FIG. 1 shows a general arrangement of a CAES system with hydrogen production, hydrogen storage and hydrogen combustion.

FIG. 1 depicts a general arrangement of an energy storage system. This is typically called a Compressed Air Energy Storage (CAES) system. The process gas used in the system may be air (e.g. atmospheric air) or a different process gas. The system can store input energy 1 in the form of a compressed process gas in store 8, until it is required to generate output energy 17. The system comprises a compressor arrangement 2, an expander arrangement 16 and a compressed gas store 8 located between the compressor arrangement 2 and the expander arrangement 16. The compressor arrangement 2 comprises a gas inlet 3 and a compressed gas outlet 4. During a compression phase of the system, electricity 1 is input to the compressor arrangement 2. The electricity 1 powers the compressor arrangement 2 to compress input air received via the gas inlet 3 to produce compressed air which is output from the compressed gas outlet 4. Typically, the gas will be atmospheric air.

The system of FIG. 1 also comprises a hydrogen production apparatus 10. A heat transfer apparatus 5 is configured to transfer heat from the process gas of the CAES system to the hydrogen production apparatus 10. In an example system, the hydrogen production apparatus 10 is configured to generate hydrogen, $H_2$, from water.

When the gas is compressed, it heats up. A first heat exchanger 5A is configured to extract heat from the gas, outputting cooled compressed gas along a path 7 to the store 8. The store 8 may be a natural structure, such as a subterranean cavern (e.g. salt cavern), well (e.g. hydrocarbon well) or a man-made structure such as a vessel capable of retaining a compressed process gas. One reason for removing heat from the gas prior to storage is because there may be a maximum temperature limit for stored gas in store 8, such as a natural cavern, well, aquifier or other store.

FIG. 1 schematically shows a heat exchanger 5A located downstream of the compressor arrangement 2. In an alternative example, the heat exchanger 5A may be co-located with the compressor arrangement 2. In an alternative example, the compressor arrangement 2 may comprise a plurality of compressor stages. A heat exchanger 5A may be located between stages of the compressor, or co-located with one of the compressor stages. There may be multiple heat exchangers 5A for the multiple compressor stages, e.g. one heat exchanger per compressor stage. In an alternative example, the heat exchanger 5A may be located upstream of the compressor arrangement 2, i.e. before the compressor arrangement 2. This has the effect of cooling the process gas before compression. Heat exchangers may be located in multiple locations, e.g. both upstream of the compressor arrangement 2 and downstream of the compressor arrangement 2.

In FIG. 1, the first heat exchanger 5A has a thermal transfer medium inlet 6 and a thermal transfer medium outlet 9. The thermal transfer medium can be, for example, water. Optionally, the water may be unpurified water and/or sea water. In operation, the thermal transfer medium (e.g. water) flows into the first heat exchanger 5A via the inlet 6, the first heat exchanger 5A transfers heat from the compressed gas to the thermal transfer medium. The thermal transfer medium (e.g. water) flowing from outlet 9 is heated compared to the thermal transfer medium flowing into the inlet 6, i.e. the thermal transfer medium (e.g. water) flowing from outlet 9 is at a higher temperature than the thermal transfer medium (e.g. water) flowing into inlet 6.

Conveniently, the water used for hydrogen production can be the transfer medium which has been heated by the first heat exchanger 5A. The hydrogen production apparatus 10 can be configured to receive the heated thermal transfer medium (e.g. heated water) either along path 9 or directly as depicted by the optional arrangement 5.

Electricity 11 may also be input to a hydrogen production apparatus 10, together with water and heat 9, to yield oxygen $O_2$ and hydrogen $H_2$. The oxygen generated by the process may optionally be vented to atmosphere and/or output via one or more outlet paths 14 for other purposes. Possible uses of the oxygen include, but are not limited to: bottling, injecting into a gas pipeline or system, or use as a process gas. Outlet path 14 may also remove other waste or products of the hydrogen production process, such as but not restricted to unprocessed water, impurities, dead or exhausted biological organisms or catalysts and other produced liquids or gases.

The hydrogen production 10 arrangement 10 can be configured to produce hydrogen by one or more of the following:

Electrolysis of water—the decomposition of water (H2O) into oxygen (O2) and hydrogen gas (H2) due to an electric current being passed through the water (water input, hydrogen and oxygen output)

Steam recombination—a method and a system for catalytic recombination of hydrogen, which is carried in a gas flow, with oxygen, has the gas flow passed through a reaction zone with a number of catalytic converter elements, with steam being added to the gas flow before it enters the reaction zone (water input, hydrogen and oxygen output).

Pyrolysis—the thermochemical decomposition of organic material at elevated temperatures in the absence of oxygen (or any halogen) (hydrogen output)

Thermolysis—a chemical reaction whereby a chemical substance breaks up into at least two chemical substances when heated. At elevated temperatures water molecules split into their atomic components hydrogen and oxygen (water input, hydrogen and oxygen output)

Thermochemical and/or chemical reaction—A variety of materials react with water or acids to release hydrogen (water input, hydrogen output)

Biological processes—algae produce hydrogen under certain conditions. If algae are deprived of sulfur they will switch from the production of oxygen, as in normal photosynthesis, to the production of hydrogen (hydrogen output)

Anaerobic corrosion—hydrogen corrosion is a form of metal corrosion occurring in the presence of anoxic water. Hydrogen corrosion involves a redox reaction that reduces hydrogen ions, forming molecular hydrogen (water input, hydrogen output).

Serpentinisation—hydrogen production by anaerobic oxidation of fayalite ferrous ions (water input and hydrogen output)

If the hydrogen production method does not involve the splitting of water into hydrogen and oxygen, for example a biological process or an alternative chemical pathway, then there is no need to remove oxygen. There may remain a need to remove other gases, products, contaminants, dead or exhausted biological organisms or catalysts, and/or wastes from the process via one or more appropriately configured outlet path 14.

In FIG. 1, the hydrogen generated by the hydrogen production apparatus 10 may be stored 13 for later use within the energy storage system, such as to heat gas at the expansion stage of the process. Other possible uses for the hydrogen generated by the hydrogen production apparatus 10 include, but are not limited to: bottling, injecting into a gas pipeline or system, or use as a process gas.

If the water is impure and/or sea water, then one or more means for removing contaminants, salt and/or other by-products may be incorporated (not shown). Examples of impure water that may be use include, but are not restricted to, sea, river, lake, aquifer, waste and rain water, and liquid sewage. Optionally, such contaminants, salts or other by-products may then be used for other purposes.

During an expansion and/or generation phase of the system, gas is released from the compressed gas store 8 and output along path 15 to an expander arrangement 16. The expander arrangement 16 is associated with a transducer 16*a*. The transducer 16*a* converts the kinetic energy of the expansion of the compressed gas in the expander arrangement 16 into another form of useful energy 17. For example, the transducer 16*a* may be an electrical generator arrangement which converts the kinetic energy of the expansion of the compressed gas into electrical energy 17. As another example, the transducer 16*a* may be a gas turbine either with or without its combustion element(s). However, it will be appreciated that in other embodiments the transducer may be of any appropriate type which converts the kinetic energy of the expansion of the compressed gas into any appropriate type of useful energy. The expanded air which has passed through the expander arrangement is output to atmosphere via an expander outlet 18.

FIG. 1 also shows one example of how hydrogen can be used during the expansion and/or generation phase of the system. Hydrogen is applied to a combustor 16*b*. The hydrogen can be supplied by the hydrogen store 13. Although the combustor 16*b* is schematically shown in FIG. 1 as separate unit, it can be incorporated with the expander arrangement 16 and/or generator 16*a*, for example as part of a gas turbine generator. Water and/or steam is output 20 as a product of combustion.

One advantage of the system of FIG. 1 is reducing, or avoiding, the need to provide additional energy to heat air at the output/expansion side of the system, or the need for a large thermal store to store heat from the input/compression side of the system until it is needed in the output/expansion side of the system. Instead, heat from the input/compression side of the system is used to assist the production of hydrogen which can subsequently be used (e.g. combusted) to provide heat at the output/expansion side of the system. A system of FIG. 1 can avoid the need to combust hydrocarbons if input energy 1, 11 is from a renewable source.

Figure 2:
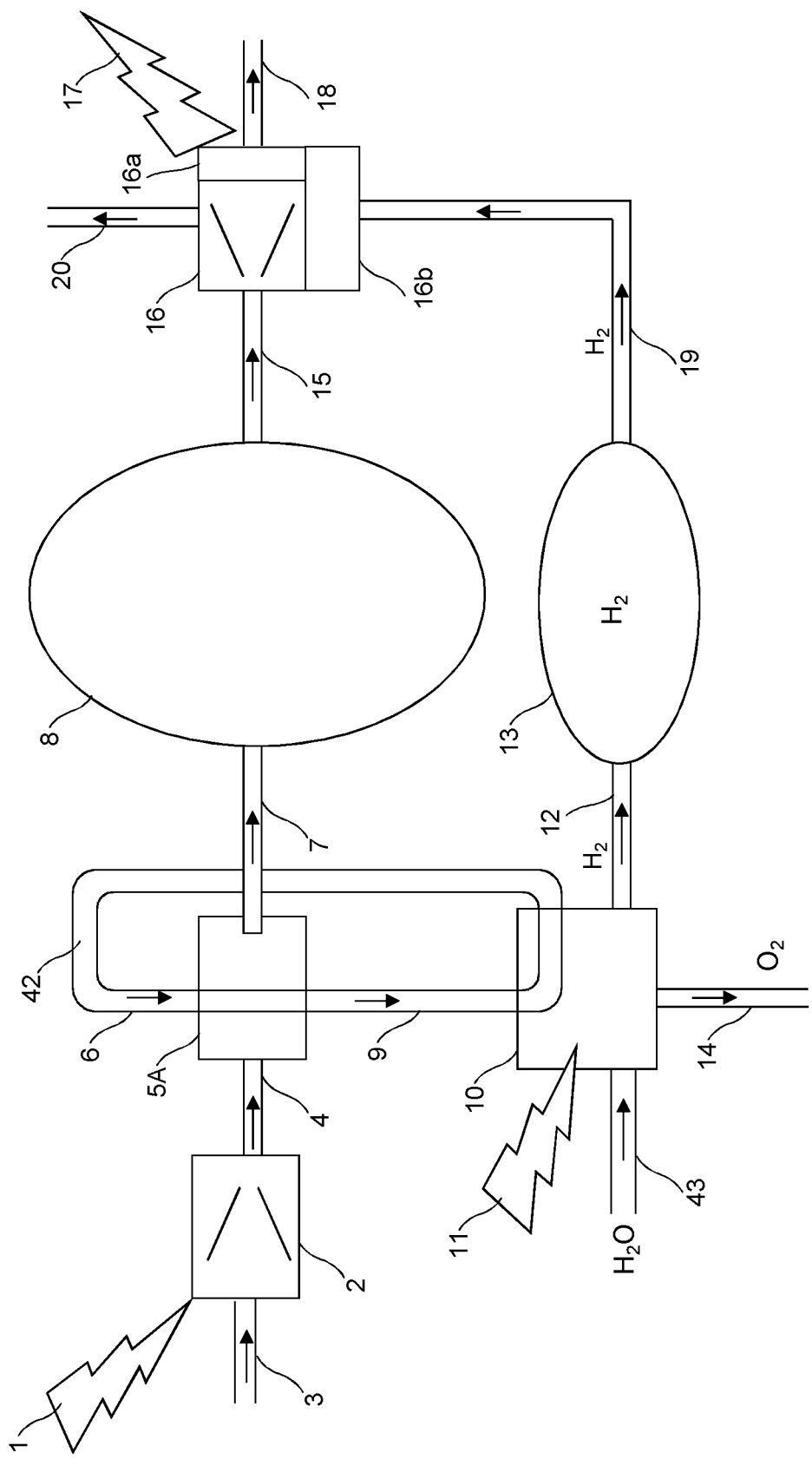
FIG. 2 shows some alternatives for heat transfer to the hydrogen production process.

FIG. 2 shows an alternative arrangement to FIG. 1, where the thermal transfer medium of the first heat exchanger 5A is operated in a closed loop. The thermal transfer medium may be water or any other suitable thermal transfer fluid. This thermal transfer medium loop may incorporate storage (not shown) of hot and/or cold thermal transfer fluid, wherein "hot" depicts any temperature hotter than "cold". Optionally, surplus heat may also be used (not shown) to heat the process gas exiting the process gas storage 15 prior to, during or after expansion; this arrangement may also incorporate storage of hot and/or cold thermal transfer fluid, wherein "hot" depicts any temperature hotter than "cold". The hydrogen production apparatus 10 has an input 43 for receiving water. As described above, the hydrogen production apparatus 10 receives water and outputs hydrogen and optionally one or more of oxygen, other gases, products, contaminants, dead or exhausted biological organisms or catalysts, and/or wastes from the process. The hydrogen production apparatus 10 receives an input of heat from the first heat exchanger 5A, via the thermal transfer medium path 42. The thermal transfer medium may optionally operate in a closed loop path, as shown by the closed loop path 42 in FIG. 2.

Figure 3:
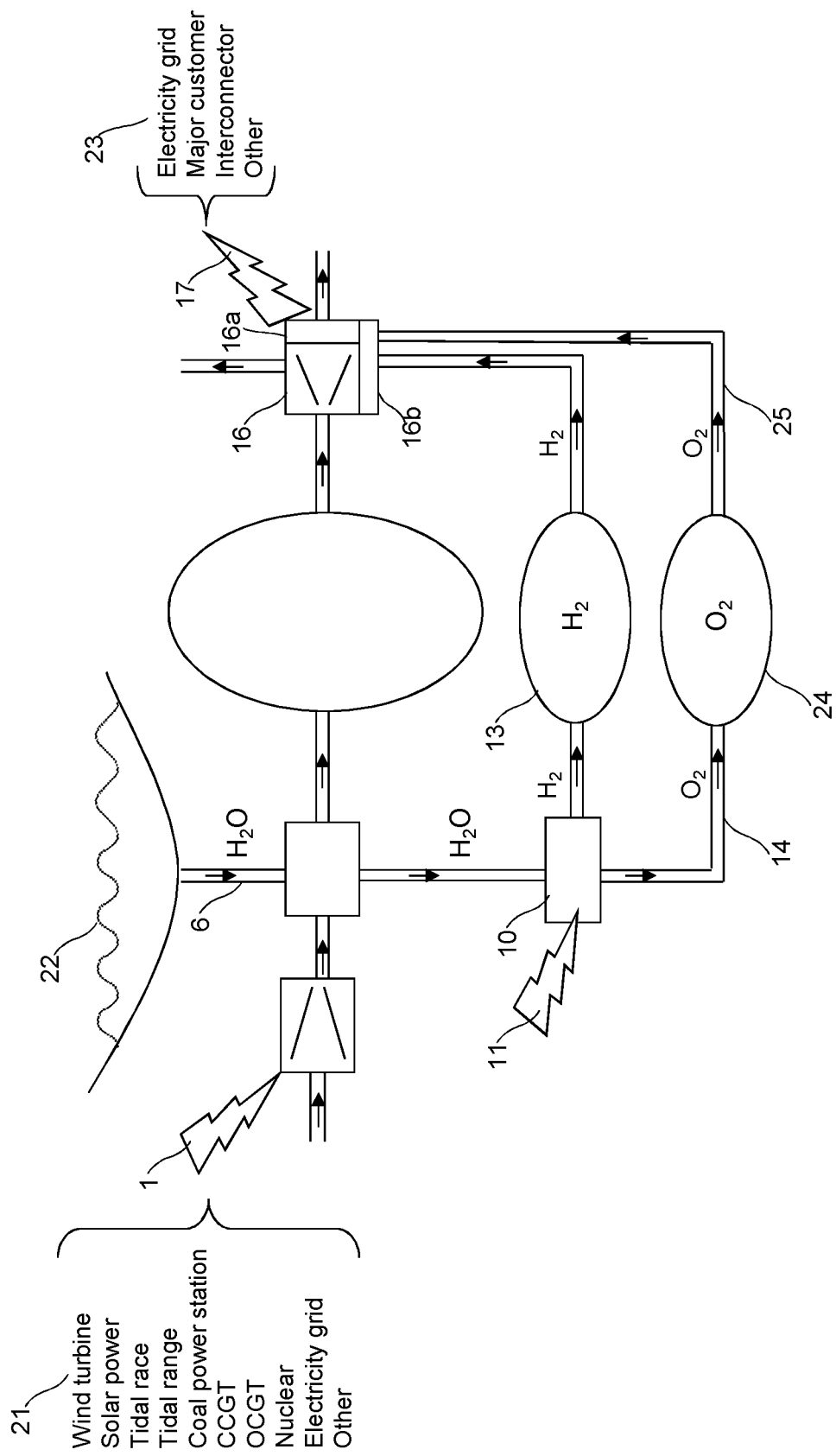
FIG. 3 shows some optional inputs and outputs of the system of FIG. 1, and also shows oxygen storage and usage.

FIG. 3 depicts the system of FIG. 1, with examples of additional features shown on the diagram. Such additional features include inputs to the system, capabilities and functions of the system, and outputs from the system. Corresponding reference numerals indicate similar features as FIG. 1.

Electricity 1, 11 may be provided by any source 21. Possible sources include one or more of: wind turbines, solar power, tidal race, tidal range, coal-fired power station, open or closed cycle gas-fired power station (OCGT, CCGT), nuclear power station and an electricity grid. Other possible sources include: hydro-electric, geothermal etc.

In one example, a CAES plant of the type described herein may be integrated with an intermittent renewable energy source such as a solar array or wind farm, in order to yield dispatchable or baseload electricity as required.

A source of water 22 that is supplied 6 to the hydrogen production apparatus 10 may be: dirty water such as, but not restricted to, sewage water; un-purified water such as, but not restricted to, river water, rain water or ground water; or saline water such as, but not restricted to, sea water, brine from a salt cavern, or water from a saline aquifer; or water from any other suitable source.

The electricity output 17 from the system may provide power to one or more of an electricity grid, one or more major customers, an interconnector or any other destination 23.

In the example depicted in FIG. 3, the oxygen exiting 14 the hydrogen production apparatus 10 may be stored in a store 24. Optionally, oxygen may be drawn from the store 24 into the expander arrangement 16 to assist combustion during the expansion/generation cycle.

Figure 4A:
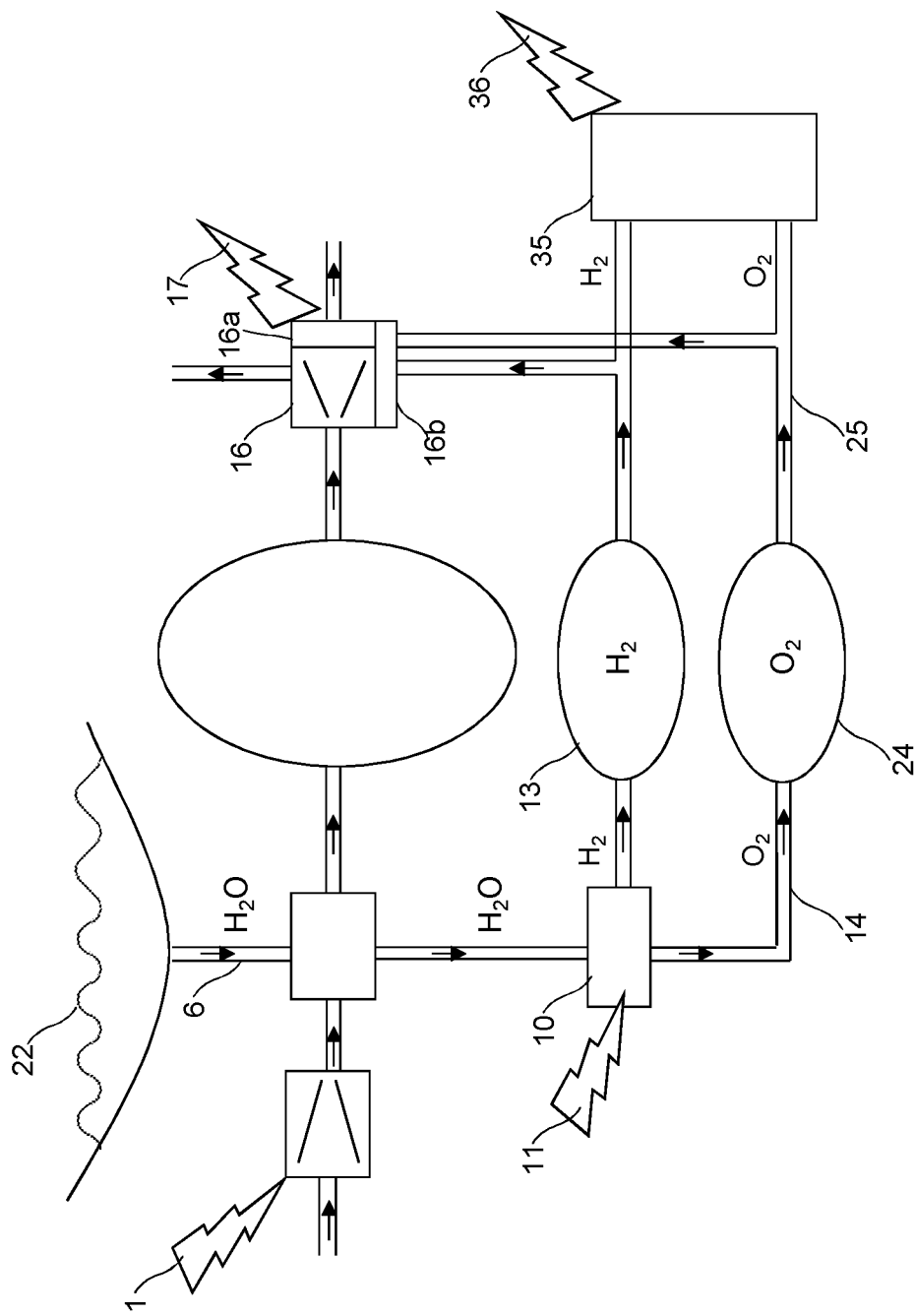
FIG. 4A shows an example system with stored hydrogen and oxygen and a fuel cell providing electrical output.

FIG. 4A shows an alternative example to FIG. 3. A fuel cell 35 receives an input of hydrogen from the hydrogen store 13 and an input of oxygen from the oxygen store 24. The fuel cell may be used to generate an electrical output 36 by combining the hydrogen and the oxygen. Some of the hydrogen and/or oxygen may optionally be fed into the apparatus for generating electricity from compressed air, as described above.

Figure 4B:
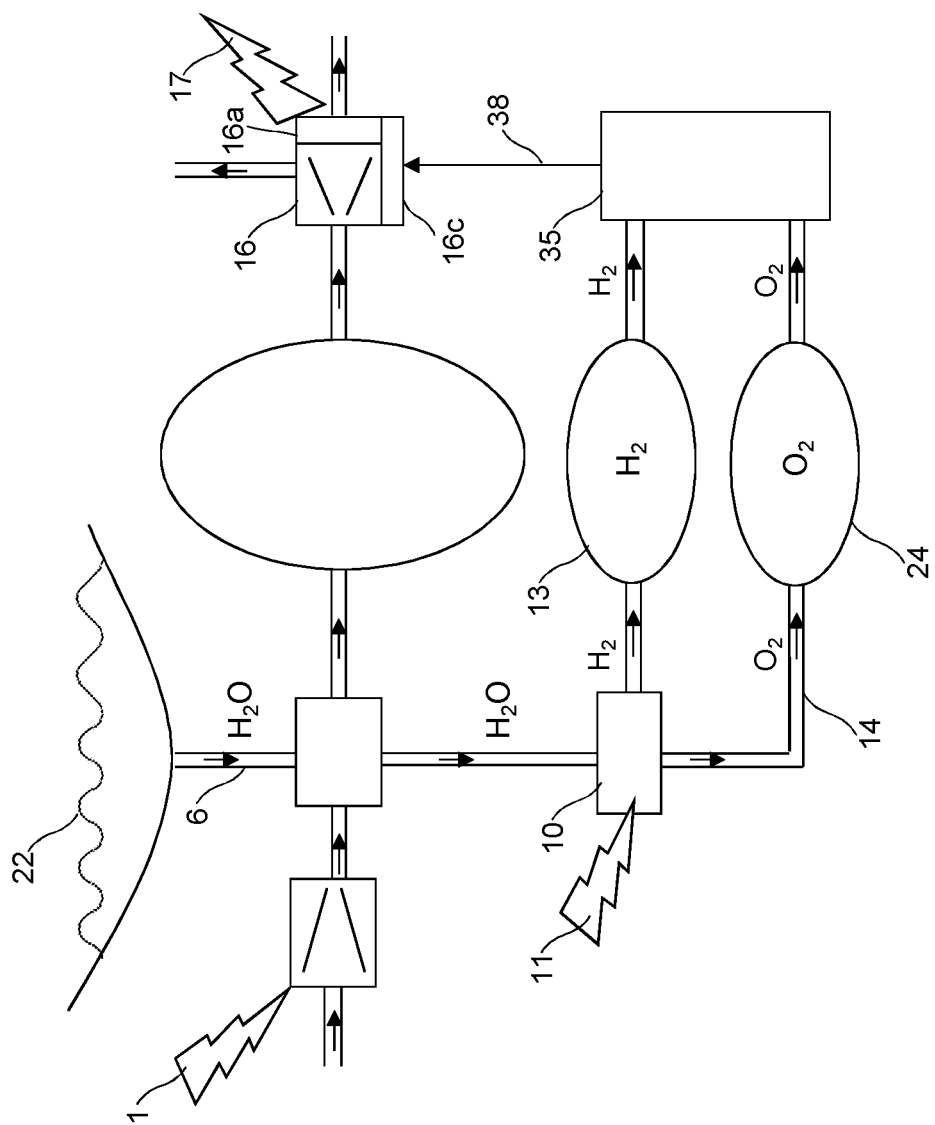
FIG. 4B shows an example system with stored hydrogen and oxygen and a fuel cell providing electrical output to a heater.

FIG. 4B shows another alternative example to FIG. 3. A fuel cell 35 receives an input of hydrogen from the hydrogen store 13 and an input of oxygen from the oxygen store 24. The fuel cell may be used to generate an electrical output 38 by combining the hydrogen and the oxygen; alternatively it may derive the required oxygen from the air. The electrical input is supplied to an electrical heater 16c. The heater is configured to use the generated electricity to provide heat prior to, during, or after expansion of the compressed gas. The heater 16c may be used instead of the combustor 16b shown in earlier Figures, or the heater 16c may be in combination with the combustor 16b shown in earlier Figures.

Other methods wherein hydrogen and/or oxygen is used to assist the generation of electricity from compressed air are possible. Likewise, other applications for any or all of the hydrogen, oxygen, other gases, products, contaminants, dead or exhausted biological organisms or catalysts, and/or wastes from the process are possible.

Figure 5:
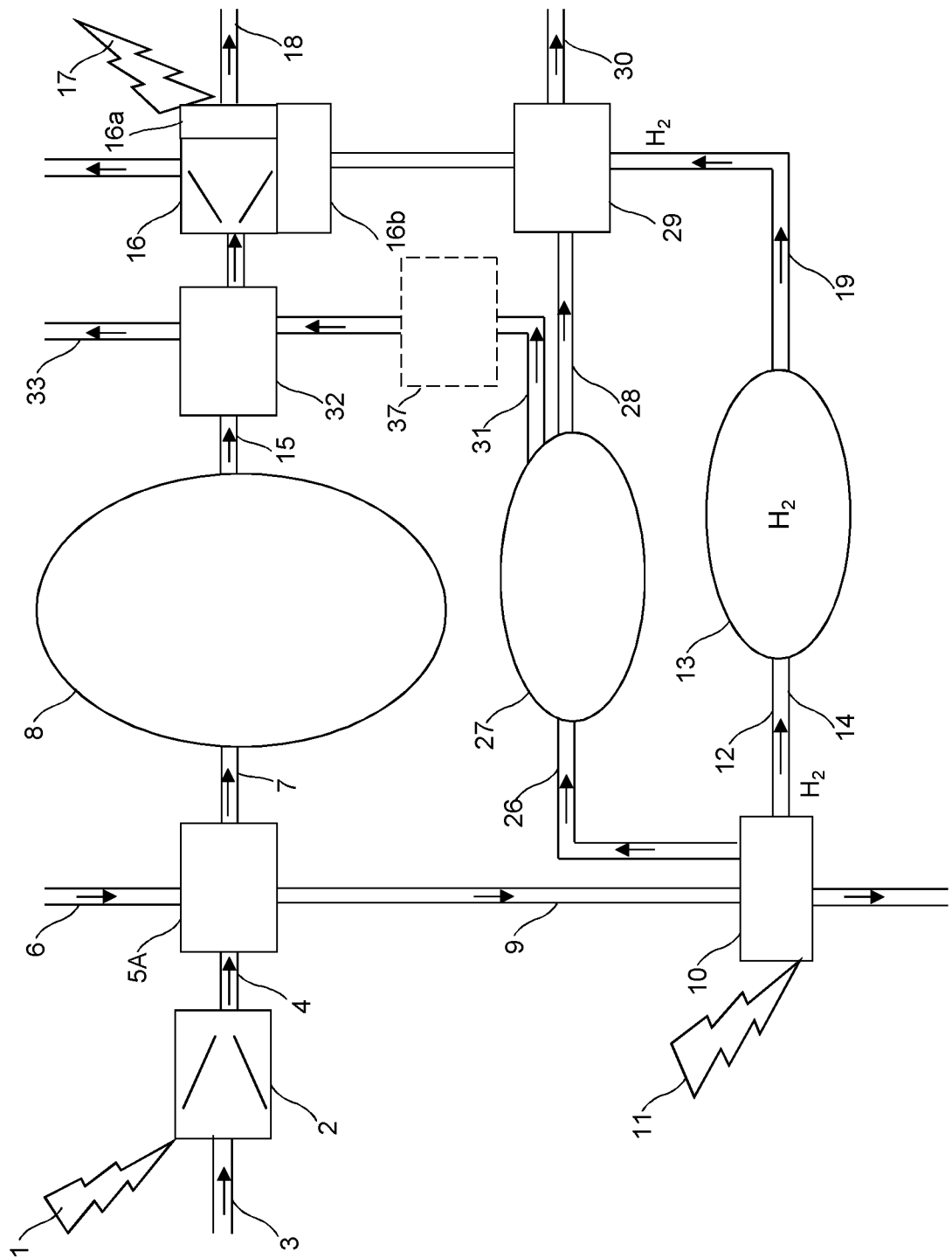
FIG. 5 shows the system of FIG. 1 integrated with thermal storage.

FIG. 5 depicts the system of FIG. 1, integrated with thermal storage. Corresponding reference numerals indicate similar features as earlier Figures. FIG. 5 illustrates one of many possible systems in which both hydrogen and heat are stored and re-used within the CAES system.

In this particular example of the system, not all of the heat from the thermal transfer medium is consumed by the hydrogen production apparatus 10. During the compression phase of operation of the system, an outflow of hot water 26 (that is, hotter than ambient temperature) from the hydrogen production apparatus 10 is stored in a thermal store 27 for later use. For simplicity, FIG. 5 depicts an embodiment wherein other uses for oxygen, other gases, products, contaminants, dead or exhausted biological organisms or catalysts, and/or wastes from the process are ignored or disposed of; in other embodiments any or all of them may be stored and/or used, as described above.

During the expansion/generation phase of operation of the system, some or all stored hot water may be output 28 from the thermal store 27 to a second heat exchanger 29 located in a hydrogen supply path 19 to combustor/generator 16. The second heat exchanger 29 is configured to pre-heat the hydrogen prior to combustion 16. In the example system of FIG. 5, the second heat exchanger 29 is located in the hydrogen supply path 19 between the hydrogen store 13 and the combustor/generator 16. Cooled thermal transfer medium (e.g. water) is output 30 from the second heat exchanger.

Alternatively or additionally, to the second heat exchanger 29, some or all of the stored thermal transfer medium (e.g. hot water) may be supplied to a third heat exchanger 32 which is configured to pre-heat the compressed air prior to combustion 16. The residual cooled water 33 is removed, for either disposal or other uses. In the example of FIG. 5, the third heat exchanger 32 is located between the compressed gas store 8 and the expander/generator 16.

In another example of the system, alternatively or additionally, some or all of the stored hot water may be fed into a fourth heat exchanger 37 which is configured to pre-heat the oxygen (not shown, for purposes of clarity) prior to combustion. In the example system of FIG. 5, the fourth heat exchanger 37 is located in the oxygen supply path 25 (as shown in FIG. 4A) between the oxygen store 24 and the combustor/generator 16. Cooled thermal transfer medium (e.g. water) is output 30 from the fourth heat exchanger 37. The residual cooled water is removed, for either disposal or other uses.

In other examples in which CAES is integrated with both hydrogen production and heat storage, the heat may be transferred into a thermal store directly (e.g. via conduction), or indirectly by means of a thermal storage medium, or by a different thermal transfer medium, by conduction through a solid, by juxtaposition of apparatus or by any other means. Likewise, the heat may be transferred out of a thermal store directly (e.g. via conduction), or indirectly by means of a thermal storage medium, or by a different thermal transfer medium, by conduction through a solid, by juxtaposition of apparatus or by any other means. Any suitable type of thermal storage means may be used.

In other examples in which CAES is integrated with both hydrogen production and heat storage, the heat may be transferred from the thermal store directly, or by means of a thermal storage medium, or by a different thermal transfer medium, by conduction through a solid, by juxtaposition of apparatus or by any other means. Such heat may be extracted from the thermal storage means in order to provide heating to any part of the system or to any fluid within the system or to any fluid entering the system during the expansion phase.

Figure 6:
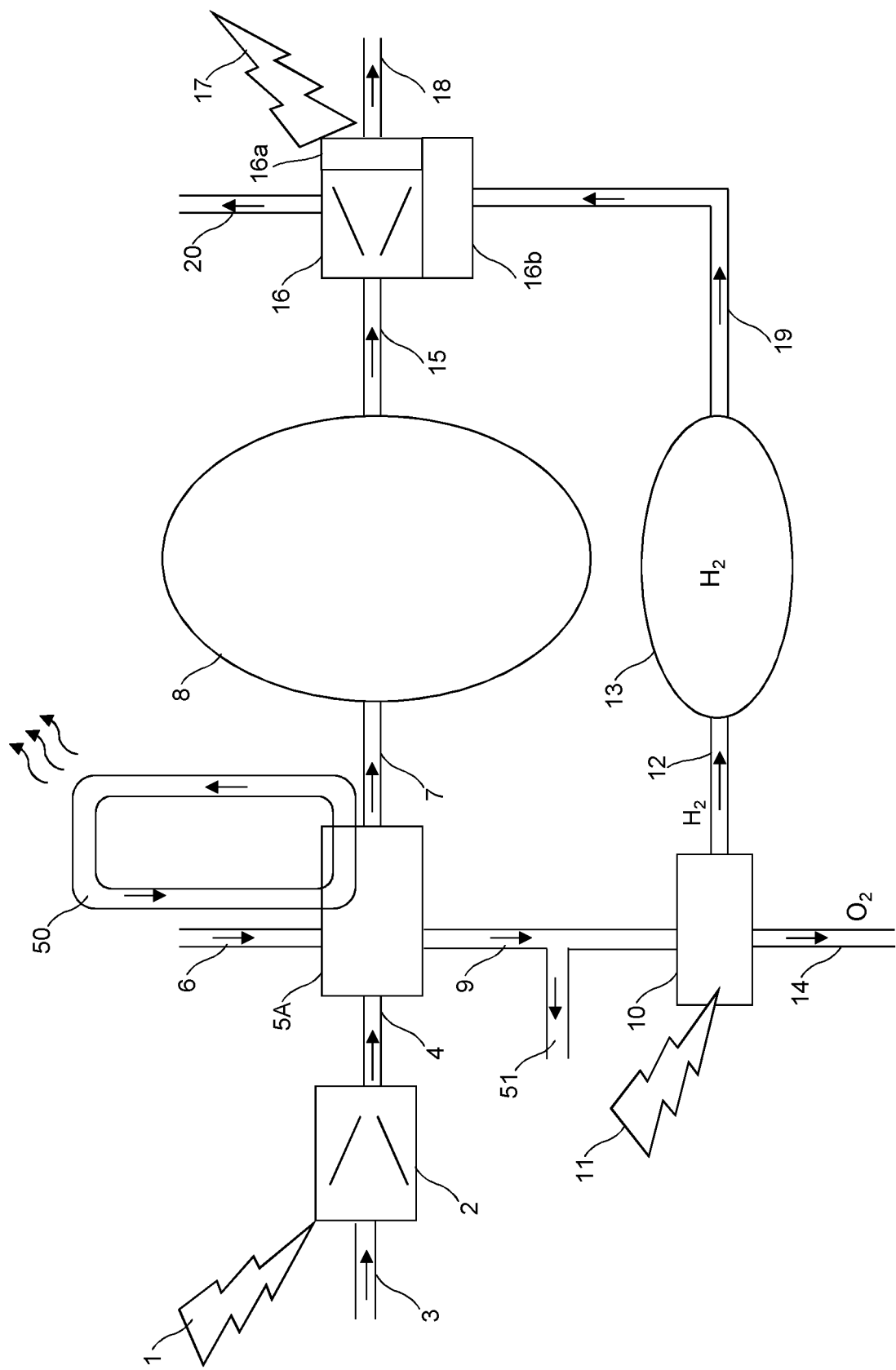
FIG. 6 shows some possible examples of using heat of compression.

FIG. 6 shows a system corresponding to FIG. 1, showing some other possible ways in which some of the heat of compression can be used. A heat transfer medium (e.g. water) can be supplied via an outlet 51 from the output path 9 between the heat exchanger 5A and the hydrogen production apparatus 10. Additionally, or alternatively, one or more further heat transfer paths 50 can be provided which receive heat directly, or indirectly, from the heat exchanger 5A. Possible uses of the heat of compression include domestic or commercial heating, heat networks, district heating etc. Alternatively, some of the hot fluid 9 may be used for such other uses including domestic or commercial heating, heat networks, district heating etc. Alternatively, some or all of the hot fluid 26 (as shown in FIG. 5) may be used for such other uses including domestic or commercial heating, heat networks, district heating etc.

The examples shown in FIGS. 1 to 6 show how heat in the compression stage of the CAES process can be used to assist hydrogen production 10, and also shows how the generated hydrogen can be used to assist with heating air or another process gas at the expansion stage of the CAES process.

Figure 7:
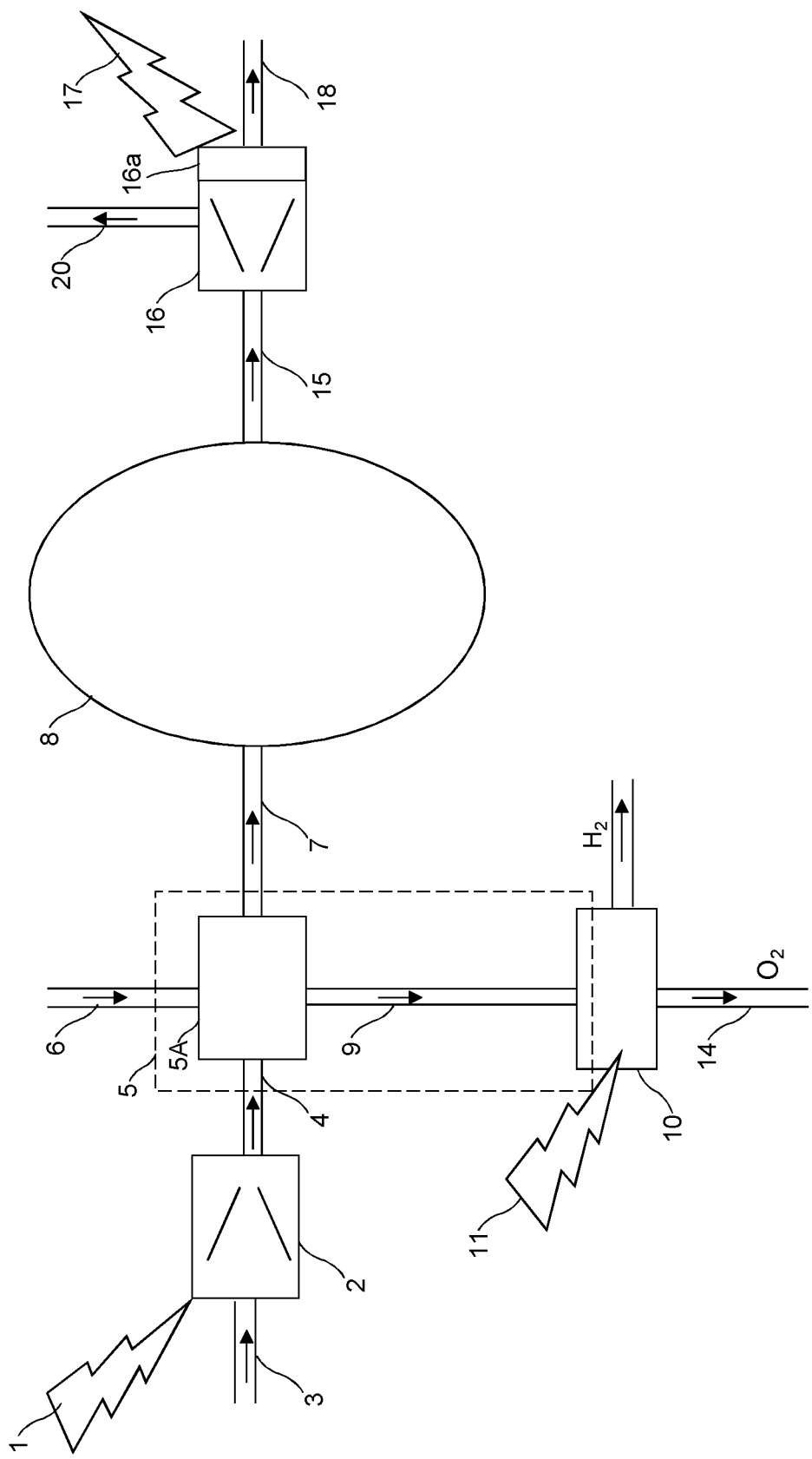
FIG. 7 shows a CAES system with hydrogen production using heat transferred from the input/compression side of the CAES system.

FIG. 7 shows an example of a CAES system where the heat of compression at the compression stage 2 of the CAES process is used to assist hydrogen production 10. Hydrogen is not used to assist with heating gas at the expansion stage 16 of the CAES process. The same applies to any output oxygen, other gases, products, contaminants, dead or exhausted biological organisms or catalysts, and/or wastes from the process. Heat may be obtained in other ways to assist with heating at the expansion stage. For example, heat may be extracted from the surrounding atmosphere, an underground heat pump, air conditioning buildings or an environment.

Other examples of a system in which CAES is integrated with both hydrogen production and heat storage include examples in which some or all of the hydrogen is used for purposes other than storage and combustion within the CAES process.

Figure 8:
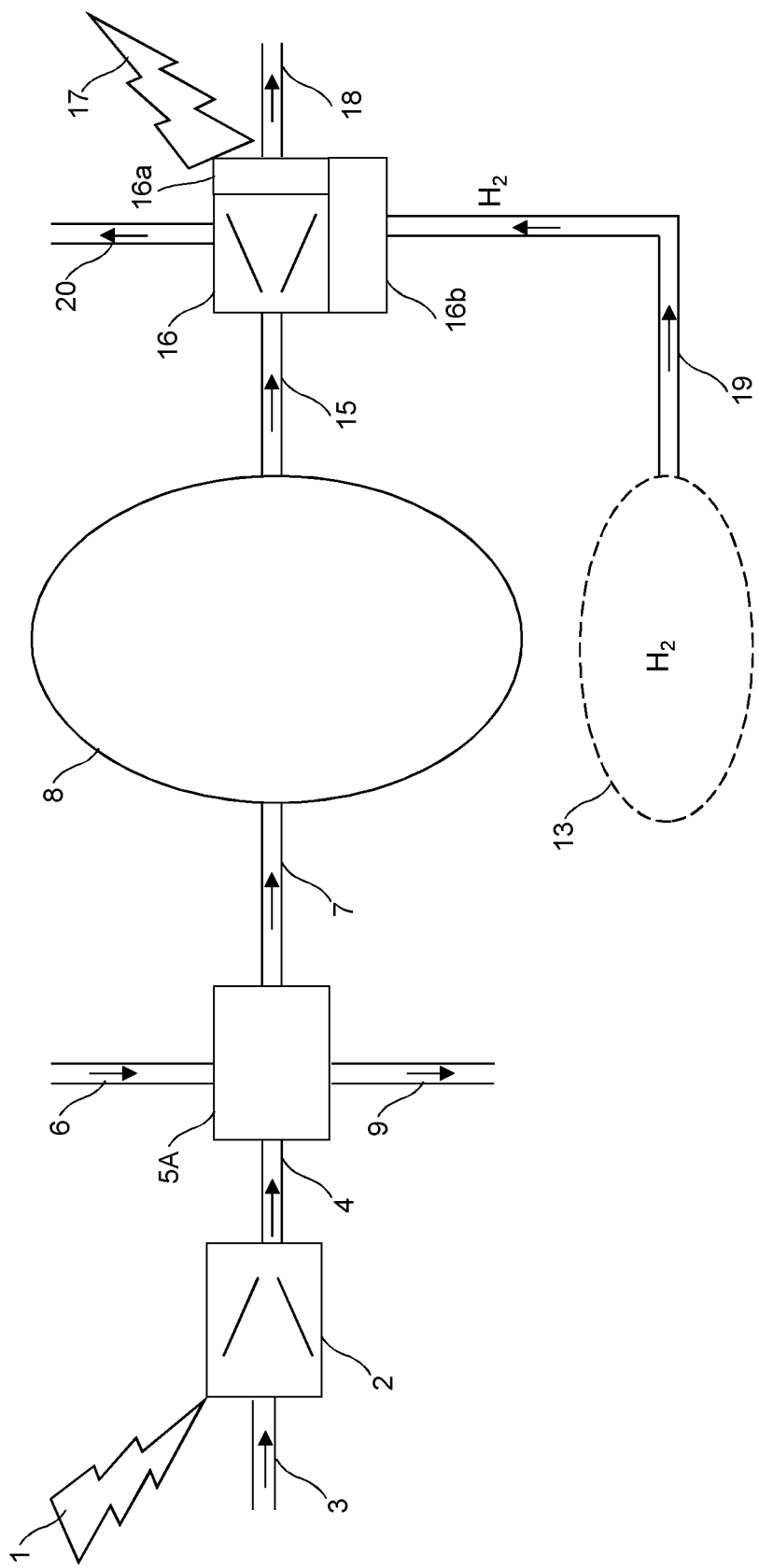
FIG. 8 shows a CAES system which uses hydrogen to provide heat on the output/expansion side of the CAES system.

FIG. 8 shows an example of a CAES system wherein hydrogen is used to assist with heating gas at the expansion stage 16 of the CAES process. The heat of compression at the compression stage 2 of the CAES process is not used to assist hydrogen production Hydrogen may be produced elsewhere and shipped in, e.g. by tanker or pipeline.

While different examples of a CAES system have been described in different Figures, it will be understood that features of the different examples can be combined to provide a functional CAES system integrated with hydrogen functionality, with improved performance in comparison with a CAES system according to prior art. Such improvements include efficiency, environmental performance including emissions, additional outputs and additional benefits derived from the CAES system.

The examples described above can be implemented as large scale (e.g. grid-scale) applications, or as off-grid, stand-alone embodiments of any size. They could also be implemented in mobile applications, for example on a ship or other means of transportation. They could also be implemented in transportable applications, for example by containerisation in one or more shipping containers.

The examples described above can be applied to the compression and expansion of atmospheric air, or any other process gas such as, but not restricted to: methane, other hydrocarbons, carbon dioxide, oxygen and hydrogen.

Other examples may use forms of energy other than electricity to provide the power to compress the air, either additionally to or instead of the electricity. Examples of input energy are kinetic, potential and chemical energy.

Other examples may produce forms of energy other than electricity from the expansion of the air, either additionally to or instead of the electricity. Examples of output energy are kinetic, potential and chemical energy.

Other examples may use forms of energy other than electricity to produce the hydrogen, such as but not restricted to radiant (for example, natural or concentrated sunlight), chemical and thermal energy.

Optionally, the oxygen produced by the hydrogen production process may also be stored for use during combustion, in order to improve combustion performance and/or to avoid 35 exhausting substantially purified oxygen which may give rise to a risk of combustion and/or explosion.

In examples in which some or all of the hydrogen and/or oxygen produced during compression is stored for combustion at the expansion stage, the hydrogen and/or oxygen may be stored in one or more of subterranean caverns (for example, salt caverns), wholly or partially depleted hydrocarbon wells (for example, oil or gas wells), aquifers (for example, saline or sweet water aquifers) or some other natural or man-made subterranean storage location (for example, mines).

Any or all of hydrogen, oxygen and the air or other process gas may be stored optionally in storage apparatus that consists wholly or partly of one or more of cylinders, bladders, solid storage such as but not restricted to activated carbon, graphene and metal hydrides, or any other mechanical or chemical means.

The CAES system may use any other suitable process gas instead of or in addition to air.

In examples in which there is additional heat storage, such heat storage may be implemented by storing the thermal transfer or process fluid, or by heating any other thermal storage material.

The water output from hydrogen combustion may be sold and/or used as drinking water or process water for other processes. It may optionally be treated before such other uses.

The storage of any or all of hydrogen, oxygen, air or any other gas may be undertaken using suitable solids in which to bind the gas. Examples of such suitable solids include 25 metal hydrides, graphene and activated carbon. Benefits of such storage include one or more of safety, improved binding of the gas, stability and compactness.

Hydrogen may be combined with nitrogen to form ammonia, which is useful as a storage means for the hydrogen, and/or as a fuel, and/or as a precursor chemical to any of a variety of chemical processes such as the manufacture of fertiliser or explosives.

An advantage of such a system incorporating the production of hydrogen include maximising the use of the input electricity, the manufacture of hydrogen which is a substance of great use in various processes, in fuel cells, in the decarbonisation of transportation, and in other applications.

Optionally such a system also produces cold as a useful product. Such cold may be suited to applications such as but not restricted to those relating to refrigeration, air conditioning and process cooling. Such applications may also involve more extremely low temperature, such as for cryogenic and super-cooling purposes.

An advantage of such a system incorporating the combustion of hydrogen include the generation of electricity from stored compressed air without emissions relating to the combustion of fossil fuels, and producing pure water and/or steam as a combustion product. Optionally such a system also produces heat as a useful product.

The benefits of such a system incorporating the production, storage and combustion of hydrogen include, additionally to the benefits cited above, a substantial increase in the round trip efficiency of the energy storage system, and optionally the purification of water. By storing both compressed air and hydrogen such a system also acts as an effective energy store, for example to receive intermittently generated electricity and output dispatchable and/or baseload electricity.

The benefits of a system in which CAES is integrated with both hydrogen production and heat storage include the pre-heating of process fluids and/or equipment in order to improve the efficiency of operation of such system.

A system comprising hydrogen production, storage and combustion as well as oxygen production, storage and combustion, and additional heat storage and re-use through process gas pre-heating, may be a configuration of the system that maximises overall system efficiency.

The production of clean water from dirty water enables the treatment and/or purification of water to be performed as a supplementary function of the system.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of energy storage comprising:
receiving input energy;
using the input energy to compress air or other process gas to produce a compressed process gas;
storing the compressed process gas;
expanding the compressed process gas to generate output energy;
performing a hydrogen production process;
transferring heat from the process gas, before the process gas is stored as a compressed process gas, to the hydrogen production process; and
using the transferred heat in the hydrogen production process.

2. The method of claim 1, further comprising using at least some of the hydrogen produced by the hydrogen production process to provide heat prior to, during, or after expanding the compressed gas.

3. The method of claim 2, further comprising storing at least some of the hydrogen produced by the hydrogen production process before using at least some of the hydrogen to provide heat prior to, during, or after expanding the compressed gas.

4. The method of claim 3, wherein using at least some of the hydrogen, or the stored hydrogen, comprises combusting the hydrogen.

5. The method of claim 1, wherein the hydrogen production process also generates oxygen, the method further comprising:
storing at least some of the oxygen produced by the hydrogen production process; and
using at least some of the stored oxygen to provide heat prior to, during, or after expanding the compressed gas.

6. The method of claim 1, wherein the hydrogen production process produces hydrogen and the method further comprises using the hydrogen in a fuel cell to generate output electricity.

7. The method of claim 1, wherein the hydrogen production process produces hydrogen and oxygen and the method further comprises using the hydrogen and oxygen in a fuel cell to generate electricity, or the hydrogen production process produces hydrogen and the method further comprises using the produced hydrogen and oxygen from an external source in a fuel cell to generate electricity.

8. The method of claim 1, further comprising:
transferring heat from the process gas, before the process gas is stored as a compressed process gas, to a thermal store and;
transferring heat from the thermal store to the process gas prior to, during, or after expansion of the compressed gas.

9. The method of claim 1, wherein transferring heat comprises at least one of:
transferring heat from the process gas before compression of the process gas;
transferring heat from the process gas during compression of the process gas;
transferring heat from the process gas after compression of the process gas.

10. The method of claim 1, wherein transferring heat comprises:
transferring heat from the process gas to a thermal transfer medium; and
transferring heat from the thermal transfer medium to the hydrogen production process.

11. The method of claim 1, wherein transferring heat comprises transferring heat from the process gas to water in order to heat the water; and the hydrogen production process operates upon the heated water.

12. The method of claim 11, wherein the hydrogen production process performs electrolysis on the heated water.

13. The method of claim 1, wherein some or all of the hydrogen produced by the hydrogen production process is used in at least one of the following ways:
output externally of the energy storage system;
output to an industrial process;
output for bottling;
used to form ammonia;
used in another chemical process;
used for one or more fuel cells;
storing for later use;
storing for transportation.

14. The method of claim 1, wherein the hydrogen production process produces hydrogen by at least one of: electrolysis of water; steam recombination;
pyrolysis; thermolysis; thermochemical and/or chemical reaction; one or more biological processes; anaerobic corrosion; serpentinisation.

15. The method of claim 1, wherein the hydrogen is stored in one or more of: a subterranean cavern; a wholly or partially depleted hydrocarbon well; an aquifer; a natural or man-made subterranean feature; a solid such as, but not restricted to, one or more of metal hydrides, graphene and activated carbon.

16. The method of claim 1, wherein the process gas is air.

17. The method of claim 1, wherein some or all of the input energy is electricity from a grid, or wherein some or all of the input energy is electricity from one or more intermittent sources.

18. The method of claim 1, wherein the output energy is electricity.

19. An energy storage system comprising:
an input to receive input energy;
a compressor arrangement configured to use the input energy to compress air or other process gas to produce a compressed process gas;
a compressed gas output configured to output the compressed process gas to a compressed process gas store;
a hydrogen production apparatus which is configured to produce hydrogen;
an expander arrangement configured to receive compressed process gas from the compressed process gas store and to expand the compressed process gas to generate output energy;
an output to output generated output energy;
a heat transfer apparatus configured to transfer heat from the process gas, before the process gas is stored as a compressed process gas, to the hydrogen production process; and
wherein the hydrogen production apparatus is configured to use the transferred heat.

20. The system of claim 19 configured to use at least some of the hydrogen produced by the hydrogen production process to provide heat prior to, during, or after expanding the compressed gas.

* * * * *

UNITED STATES PATENT AND TRADEMARK OFFICE
CERTIFICATE OF CORRECTION

| | |
|---|---|
| PATENT NO. | : 11,913,434 B2 |
| APPLICATION NO. | : 17/263817 |
| DATED | : February 27, 2024 |
| INVENTOR(S) | : Howitt et al. |

It is certified that error appears in the above-identified patent and that said Letters Patent is hereby corrected as shown below:

On the Title Page

(57) Abstract, Line 1: Please correct "In A" to read --A--

OTHER PUBLICATIONS, Page 2, Line 8: Please correct "Caverns I" to read --Caverns /--

In the Specification

Column 4, Line 41: Please correct "stored 20" to read --stored--

Column 4, Line 47: Please correct "an 25" to read --an--

Column 7, Line 25: Please correct "35 preceding" to read --preceding--

Column 13, Line 38: Please correct "production Hydrogen" to read --production 10. Hydrogen--

Column 14, Line 8: Please correct "avoid 35" to read --avoid--

Column 14, Line 37: Please correct "include 25" to read --include--

Signed and Sealed this
Twenty-third Day of April, 2024

Katherine Kelly Vidal
*Director of the United States Patent and Trademark Office*